(12) United States Patent  
Sakagami et al.

(10) Patent No.: US 7,432,497 B2  
(45) Date of Patent: Oct. 7, 2008

(54) ABSOLUTE LINEAR ENCODER

(75) Inventors: Seiji Sakagami, Kawasaki (JP); Mikiya Teraguchi, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 0 days.

(21) Appl. No.: 11/535,783

(22) Filed: Sep. 27, 2006

(65) Prior Publication Data

US 2007/0069117 A1  Mar. 29, 2007

(30) Foreign Application Priority Data

Sep. 29, 2005 (JP) .............. 2005-283625

(51) Int. Cl.  
*G01D 5/34* (2006.01)  
*G01D 5/36* (2006.01)  
*H03M 1/22* (2006.01)  
*G01B 11/14* (2006.01)  
*G01B 7/30* (2006.01)

(52) U.S. Cl. .............. 250/231.18; 250/237 R; 341/11; 356/617; 33/1 PT

(58) Field of Classification Search ............ 250/231.13, 250/231.14, 231.15, 231.16, 231.17, 231.18, 250/237 R, 237 G; 33/1 PT, 1 N; 341/11, 341/13, 31; 356/616, 617  
See application file for complete search history.

(56) References Cited

U.S. PATENT DOCUMENTS

| | | | | |
|---|---|---|---|---|
| 4,983,900 A | * | 1/1991 | Nashiki et al. | 318/652 |
| 5,442,166 A | * | 8/1995 | Hollmann | 250/201.1 |
| 5,563,408 A | * | 10/1996 | Matsumoto et al. | 250/231.14 |
| 6,421,132 B1 | * | 7/2002 | Brajovic | 356/602 |
| 6,642,509 B2 | * | 11/2003 | Miyata | 250/231.13 |

* cited by examiner

*Primary Examiner*—Georgia Y. Epps  
*Assistant Examiner*—Don Williams  
(74) *Attorney, Agent, or Firm*—Rankin, Hill & Clark LLP

(57) ABSTRACT

An absolute linear encoder includes a plurality of absolute scales aligned in the detection direction with absolute calibrations, a plurality of detectors for detecting the calibrations on the absolute scales, absolute position data generating portions of each scale for generating absolute position data of each detector, and a calculator for outputting an absolute position over the whole length of connected whole absolute scales adding the absolute position data of each detector and the distance between the detectors. The detectors are fixed at such intervals as to simultaneously detect the calibrations of the two absolute scales adjoining in a scale connecting section. Thus, the long absolute linear encoder which is easy to use is realized at low costs.

11 Claims, 11 Drawing Sheets

ABSOLUTE LINEAR ENCODER

CROSS-REFERENCE TO RELATED APPLICATION

The disclosure of Japanese Patent Application No. 2005-283625 filed on Sep. 29, 2005 including specifications, drawings and claims is incorporated herein by reference in its entirety.

BACKGROUND OF THE INVENTION

1. Field of the Invention

The present invention relates to absolute linear encoders for detecting an absolute position. In particular, the present invention relates to an absolute linear encoder which covers a long measurement range and is easy to handle.

2. Description of the Related Art

In order to enable a linear scale to cover a long measurement range, it is necessary to manufacture a long scale. However, in the case of, for example, a photoelectric scale, there are limitations on the length of an exposure device for forming calibrations on the scale, so that it is difficult to manufacture the integral long scale.

Thus, in an incremental scale in which a calibration pattern for detecting relative displacement has repeated continuity, as described in Japanese Patent Laid-Open Publications Nos. 2004-233346, Hei10-18791, Hei6-137899, Hei6-194186, and 2000-55647, it is proposed that a plurality of incremental scales is aligned in the direction of detection, and a continuous sine wave (analog signal in A and B phases) is output in a scale connecting section irrespective of discontinuous calibrations.

Against the foregoing incremental scale, an absolute scale which can detect an absolute position is in practical use. This absolute scale does not need to take the initial action in order to obtain an original position or an reference position on turning power on, though the incremental scale needs it. Thus, the absolute scale is favorable for a multi-head in which many detection heads are attached to a single scale. Also, the absolute scale is able to be used instead of a Hall sensor for detecting a magnetic pole position, so that it is favorably used for feedback control of a linear motor.

In the case of the absolute scale for detecting the absolute position, however, manufacturing a long integral absolute scale over, for example, 3 m is not easy. Because phase relation differs in each position of calibrations in which, for example, a plurality of continuous patterns at regular intervals is combined in parallel and a calibration pattern does not have repeated continuity. Even if a long scale can be manufactured, there is a problem that the integral scale is not easy to transport and attach.

SUMMARY OF THE INVENTION

The present invention has been devised to solve the foregoing conventional problems. An object of the present invention is to provide a long absolute linear encoder which covers a long measurement range and is easy to transport and attach at low costs.

To achieve the foregoing object, the present invention provides an absolute linear encoder for detecting an absolute position. The absolute linear encoder includes: a plurality of absolute scales aligned in a direction of detection, the absolute scale having absolute calibrations for detecting the absolute position; a plurality of detectors for detecting the calibrations on the absolute scales, the detectors being fixed at such intervals as to simultaneously detect the calibrations of the two absolute scales adjoining in a scale connecting section; absolute position data generating portion of each scale for generating absolute position data of each detector; and a calculator for outputting the absolute position over the whole length of connected whole absolute scales adding the absolute position data of each detector and an offset value between the detectors.

Judging portion for switching the plurality of detectors with hysteresis processing at switching may be provided further.

The foregoing plurality of absolute scales may have the absolute calibrations different from each other.

By the use of the absolute position data detected by the foregoing plurality of detectors, it is possible to judge the absolute position to be outputted.

The foregoing plurality of absolute scales may have the same absolute calibrations.

The foregoing plurality of absolute scale may be displaced upside down with each other.

Furthermore, means for distinguishing each of the absolute scales may be provided.

A distinguishing code may be a magnetic metal tape, and a magnetic sensor may be used as a distinguishing code sensor.

The means for distinguishing the scale may be the distinguishing code disposed on a face without the absolute calibrations or a layer without the absolute calibrations in the scale.

The distinguishing code may be a light and dark pattern printed on a protective film of the absolute calibrations of an electromagnetic induction type or a capacitance type, and a photoelectric sensor may be used as the distinguishing code sensor.

According to the present invention, since division can shorten scale length with respect to final measuring range of absolute scale (for example, two 3 m scales for 6 m measuring range), manufacturing equipment for a long scale is unnecessary and it is possible to easily manufacture the scale at low costs. There are transport cost and storage cost advantages too.

Furthermore, an integral scale is difficult to not only transport and store but also attach. In the case of the divided scale, however, attachment can be easily carried out on a short scale basis.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

Exemplary embodiments of the present invention will be hereinafter described in detail with reference to drawings.

Figure 1:
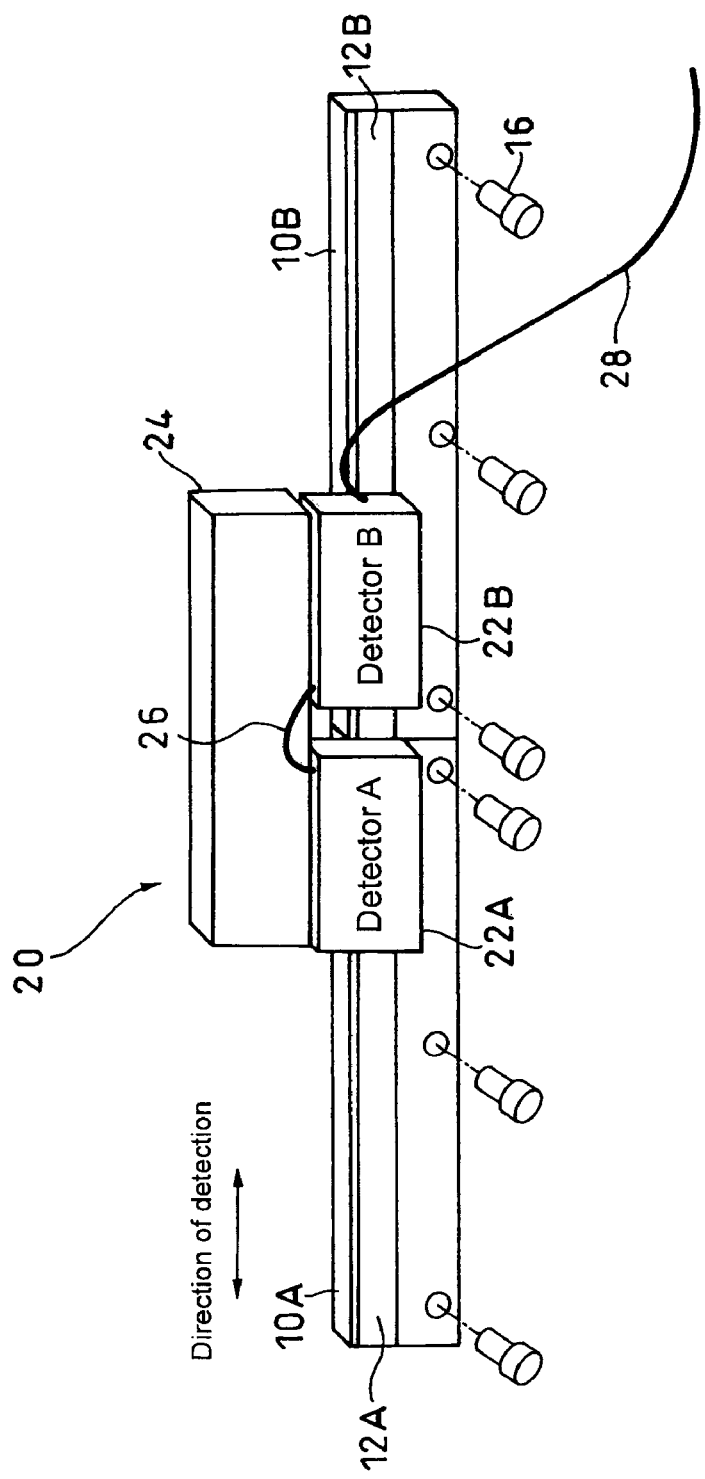
FIG. 1 is a perspective view showing the essential structure of a first exemplary embodiment of the present invention.

A first exemplary embodiment of the present invention in which two absolute scales are connected comprises, as shown in FIG. 1 (perspective view of essential structure) and FIG. 2 (block diagram of a signal processing circuit), two absolute scales (hereinafter simply called "scale" too) 10A and 10B, a detection head 20, and a signal processing circuit 30.

The two absolute scales 10A and 10B aligned in the direction of detection (horizontal direction in the drawing) have different absolute calibrations (hereinafter simply called "calibrations" too) 12A and 12B to detect an absolute position.

The detection head 20 has detectors 22A and 22B for detecting the calibrations 12A and 12B on the absolute scales 10A and 10B. The detectors 22A and 22B are fixed by a coupling board (may be a bracket of a user) 24 at such an arbitrary central interval D as to simultaneously detect the calibrations 12A and 12B of the two scales 10A and 10B adjoining in a scale connecting section 14, and are electrically connected by a connection cable 26.

Figure 2:
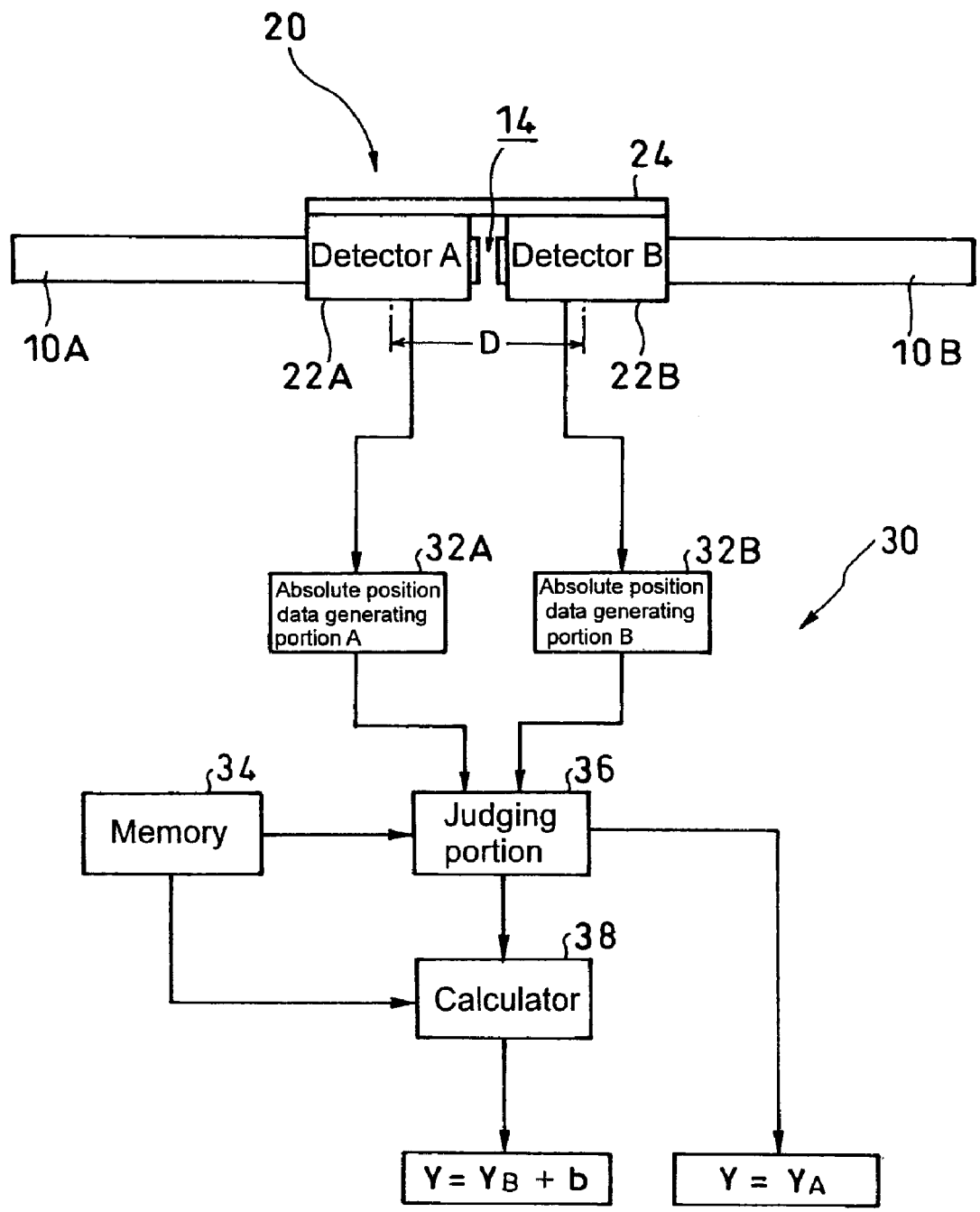
FIG. 2 is a block diagram showing a signal processing circuit of the same exemplary embodiment.

The signal processing circuit 30 has, as shown in FIG. 2, absolute position data generating portions 32A and 32B for generating the absolute position data of the respective detectors 22A and 22B, a memory 34 which stores a position setting value for switching between the output values of the absolute position data generating portions 32A and 32B of each of the detectors 22A and 22B and an offset value (a difference of the absolute position data between the detectors 22A and 22B) of absolute position data between the different scales 10A and 10B, a judging portion 36 for switching between the absolute position data generating portions 32A and 32B in accordance with the output of the absolute position data generating portions 32A and 32B and the position setting value stored in the memory 34, and a calculator 38 for adding the offset value stored in the memory 34 for output in accordance with the output of the judging portion 36 if necessary.

In FIG. 1, the reference numeral 16 denotes a scale fixing screw for fixing the scales 10A and 10B on one side of a measured object. The reference numeral 28 denotes a cable for electrically connecting the detection head 20 to the signal processing circuit 30.

The scales 10A and 10B have the absolute calibrations 12A and 12B for detecting a unique absolute position in the whole measurement length. Therefore, no absolute position data showing the same absolute position does not exist between absolute calibrations 12A and 12B.

Operation will be hereinafter described.

First, when the scales 10A and 10B are fixed on the object to be measured with the scale fixing screws 16, the strict continuity of a calibration period is not necessary, though it was necessary when a single detector detects a conventional incremental scale. Thus, precise alignment is not necessary. The scales 10A and 10B are firmly fixed so that relative position does not change, and the difference of the position detection data, namely distance, between the detectors 22A and 22B is stored in the memory 34 as an offset value.

Figure 3:
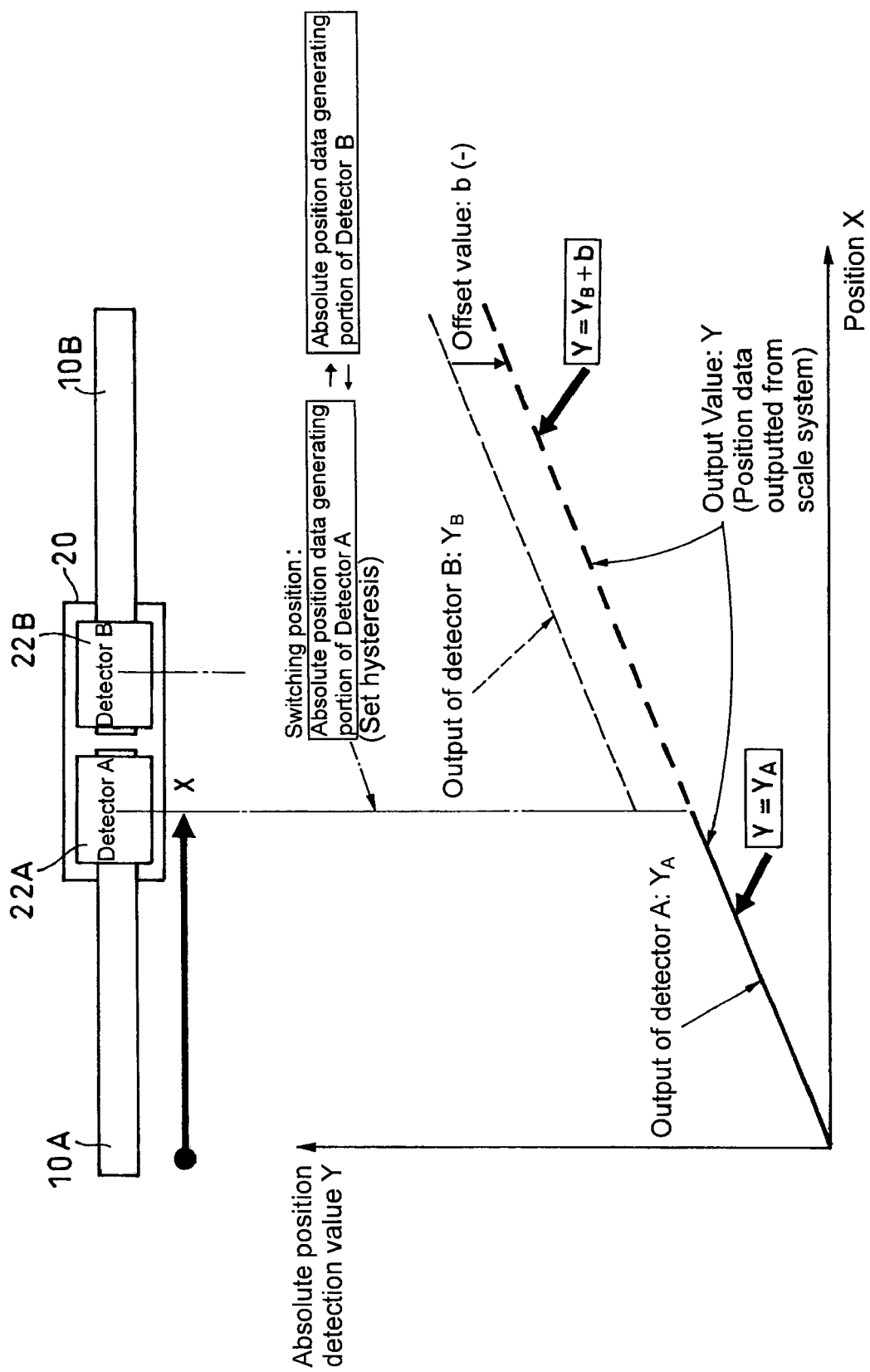
FIG. 3 is a diagram showing the operation of the same exemplary embodiment.

Then, as shown in FIG. 3, for example, on the left side of an output switching point on which the detector 22A normally detects the calibrations 12A of the scale 10A to be referred, the output $Y_A$ of the detector 22A as is becomes the output value Y of absolute position data outputted from a scale system.

When it is judged that the detector 22A is moved from the absolute position data generating portion 32A of the detector 22A to the absolute position data generating portion 32B of the other detector 22B to be on the right of the output switching point, on the other hand, a value $Y=Y_B+b$ added the offset value b (minus value) between both of the detectors to the output value $Y_B$ of the right detector 22B becomes the output value Y.

In this manner, it is possible to detect a continuous position by judging the absolute detection positions of the two detectors 22A and 22B even if the calibrations are discontinuous.

In switching between the absolute position data of the detectors 22A and 22B, a hysteresis may be provided and the position of the output switching point is changed in the direction of a count in order to prevent frequent switching.

In this exemplary embodiment, the outputted absolute position data is judged with the use of the absolute position data by the two detectors 22A and 22B, so that the judging portion 36 can easily judge and switch. In the incremental scale, on the other hand, positions of the detectors 22A, 22B on which incremental scale they are exist can not be detected directly after power on. Therefore, independent sensor for detecting position of the detectors to know on which incremental scale they are exist, is necessary. Further, independent pattern to be detected by the sensor is necessary on the incremental scale, too. Therefore, the structures of a detection unit and scale calibrations become complicated.

Regarding to the attachment of the scale, the alignment of the calibrations is not necessary. If one of the two detectors 22A and 22B is detectable, continuous output is possible even if there is a missing section between the scale calibrations 12A and 12B in the scale connecting section 14.

Furthermore, the offset value b between the scales can be obtained in such a state that the two detectors 22A and 22B are opposed to the scales respectively, across the scale connecting section 14 after the scales are attached.

The difference D between the absolute position data of the detectors 22A and 22B (or the central distance D between the two detectors) can be obtained in such a state that both detectors are opposed to the same scale.

When the distance between the scales is varied with the lapse of time, an amount of variation is detected and an alarm for recorrection may be outputted or the offset value may be automatically corrected. For example, the distance between the scales is periodically checked, and the offset value may be corrected. Otherwise, check positions in which the two detectors 22A and 22B detect $Y_A$ and $Y_B$ are set in advance, and passing the positions may trigger an automatic check to correct the offset value.

The two detectors 22A and 22B may be contained in a single case.

Figure 4:
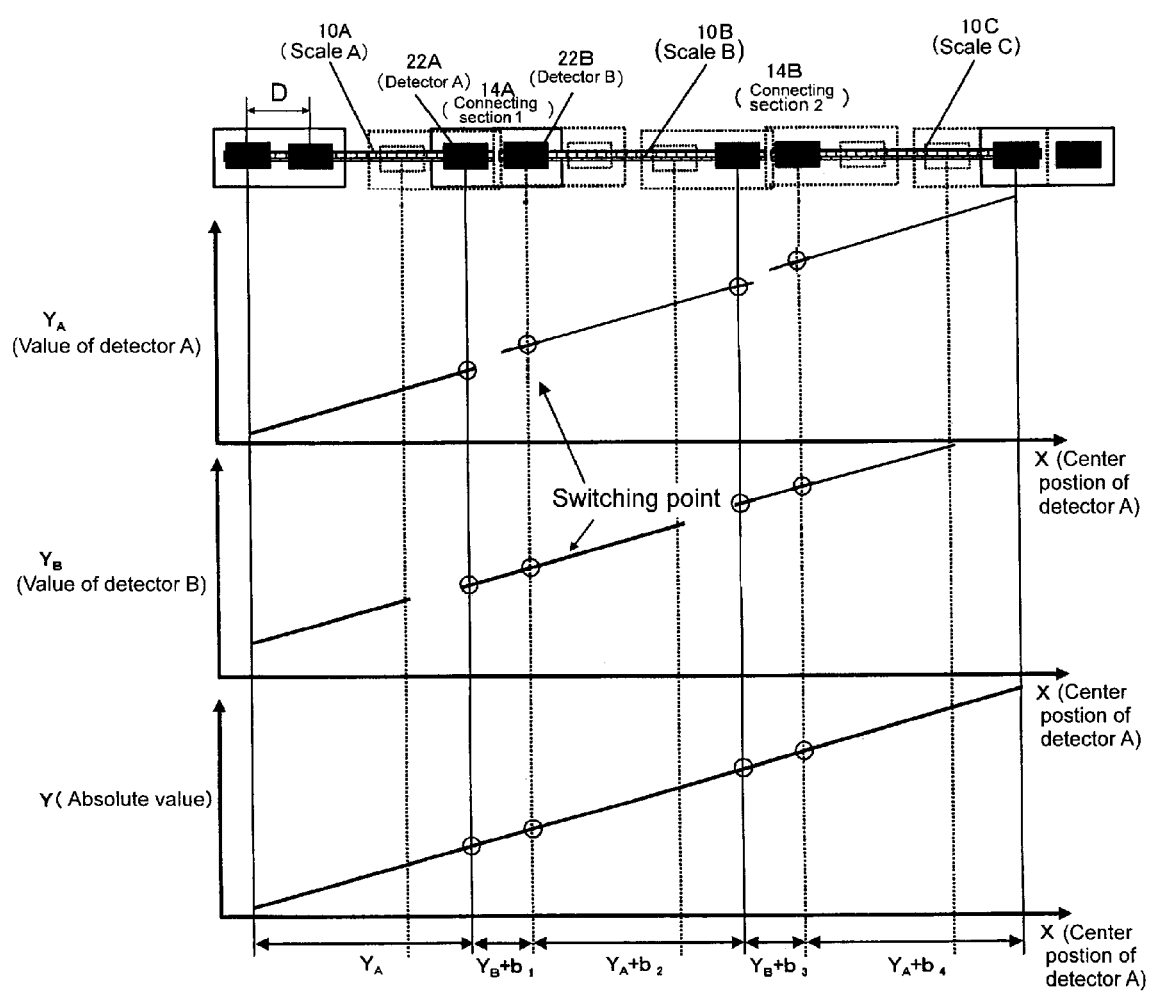
FIG. 4 is a diagram showing the essential structure and the operation of a second exemplary embodiment of the present invention.

FIG. 4 shows the essential structure and operation of a second exemplary embodiment in which there are n scales. In the drawing showing an example of n=3, the reference numeral 10C denotes a third scale, 14A a connecting section 1 between the scales 10A and 10B, and 14B a connecting section 2 between the scales 10B and 10C.

In this embodiment, all the scales A, B and C have one and unique position detection value, namely, they do not have the same position detection value and they are combination of scales which outputs different (unique) position detection value with each other.

Further, absolute value Y of whole scale which is a combination of the scales A, B and C is defined to be an absolute value of center position of the detector A.

At the switching points of the connecting sections 1 and 2, absolute position data by the both detectors A and B to the scales A and B, or to the scales B and C are output at the same time.

Each offset values $b_1$, $b_2$, $b_3$ and $b_4$ may be measured actually by a master scale and determined. The distance D between the detectors is included in the offset values $b_1$, $b_2$, $b_3$ and $b_4$.

In the first and second exemplary embodiments, since it is necessary that each scale can uniquely determine an absolute position, unique absolute calibrations over the whole length is necessary.

Then, third and fourth exemplary embodiments of the present invention which can use absolute scales with the same calibrations and hence has a cost advantage and has no limitation of a maximum measurement length will be described.

Figure 5:
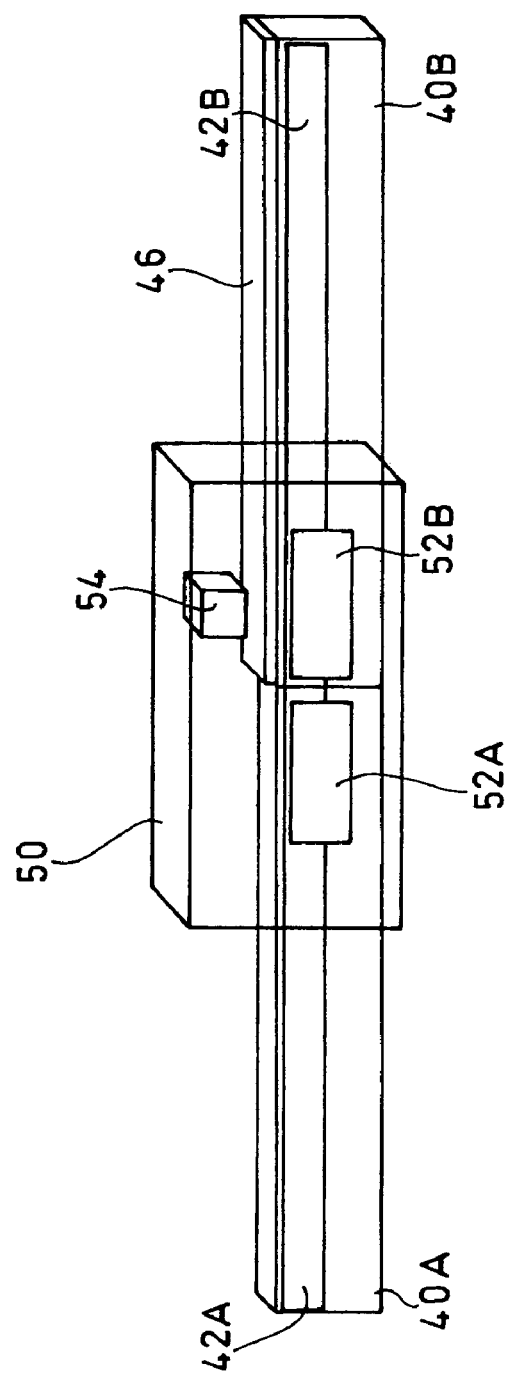
FIG. 5 is a perspective view showing the essential structure of a third exemplary embodiment of the present invention.
Figure 6:
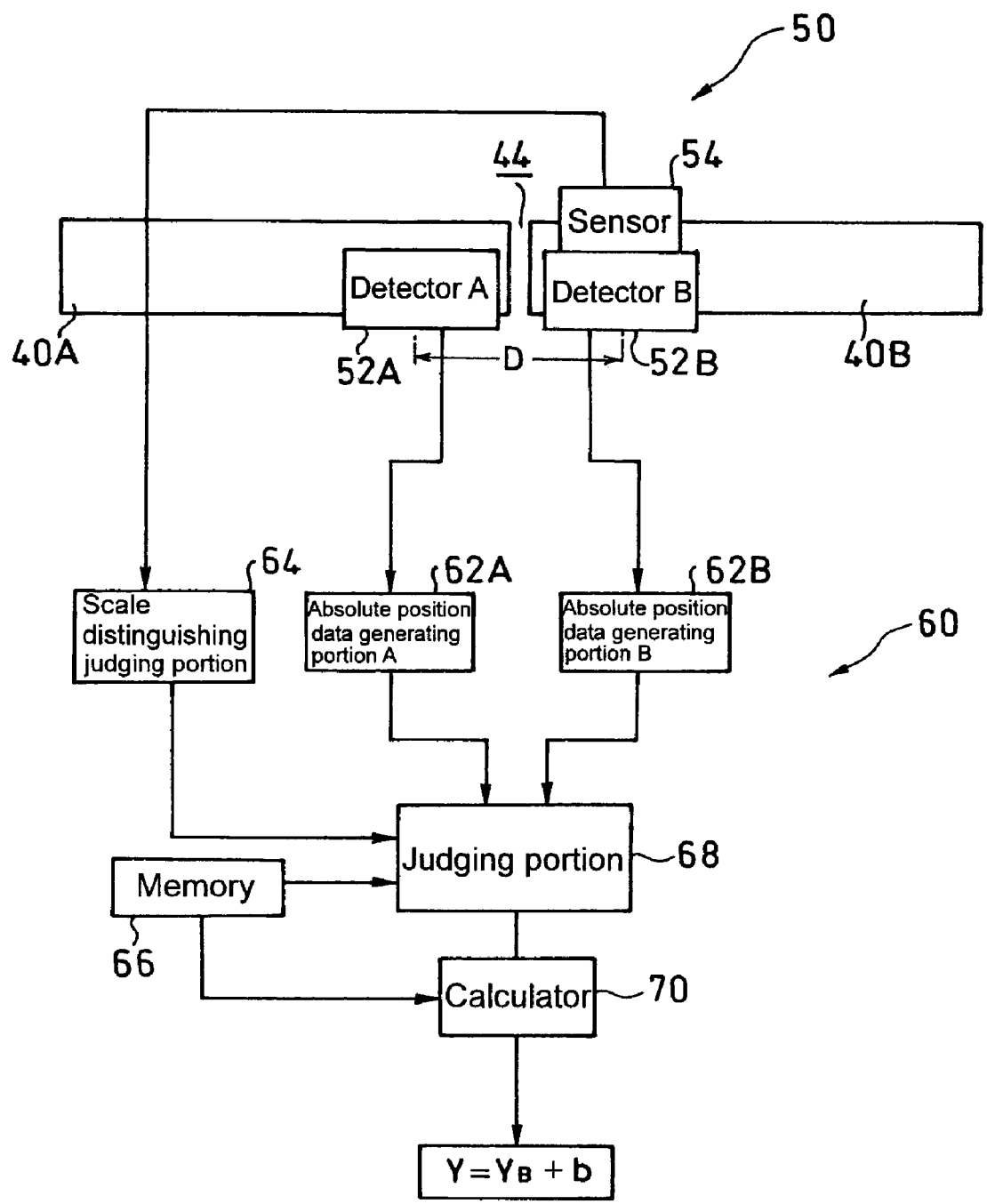
FIG. 6 is a block diagram showing a signal processing circuit of the same exemplary embodiment.

The third exemplary embodiment of the present invention comprises, as shown in FIG. 5 (perspective view of essential structure) and FIG. 6 (block diagram of a signal processing circuit), absolute scales 40A and 40B, a steel tape 46, a detection head 50, and a signal processing circuit 60.

The absolute scales 40A and 40B aligned in the direction of detection have the same absolute calibrations as main calibrations 42A and 42B.

The steel tape 46 as a distinguishing code is provided on the side of one of the scales (right scale 40B in the drawing).

The detection head 50 has two main position detectors 52A and 52B for detecting the main calibrations 42A and 42B on the absolute scales 40A and 40B and a magnetic sensor 54 as a code distinguishing sensor for detecting the existence of the steel tape 46. The main position detectors 52A and 52B are fixed across a central interval D so as to simultaneously detect the main calibrations 42A and 42B of the two absolute scales 40A and 40B adjoining in a scale connecting section 44.

The signal processing circuit 60, as shown in FIG. 6, has absolute position data generating portions 62A and 62B, a scale distinguishing judging portion 64, a memory 66, a judging portion 68, and a calculator 70. The absolute position data generating portions 62A and 62B are provided each of the main position detectors 52A and 52B, respectively. The scale distinguishing judging portion 64 distinguishes the scale on the basis of the output of the magnetic sensor 54. The memory 66 stores a position setting value for switching between the output values of the respective absolute position data generating portions 62A and 62B and an offset value of absolute position data of the different scales. The judging portion 68 judges that which of the outputs of the absolute position data generating portions 62A and 62B is used based on the output of the scale distinguishing judging portion 64. The calculator 70 adds the offset value stored in the memory 66 as necessary and outputs a result on the basis of the output of the judging portion 68.

The scales 40A and 40B have main calibrations 42A and 42B for detecting absolute positions which are unique in each of them.

Figure 10:
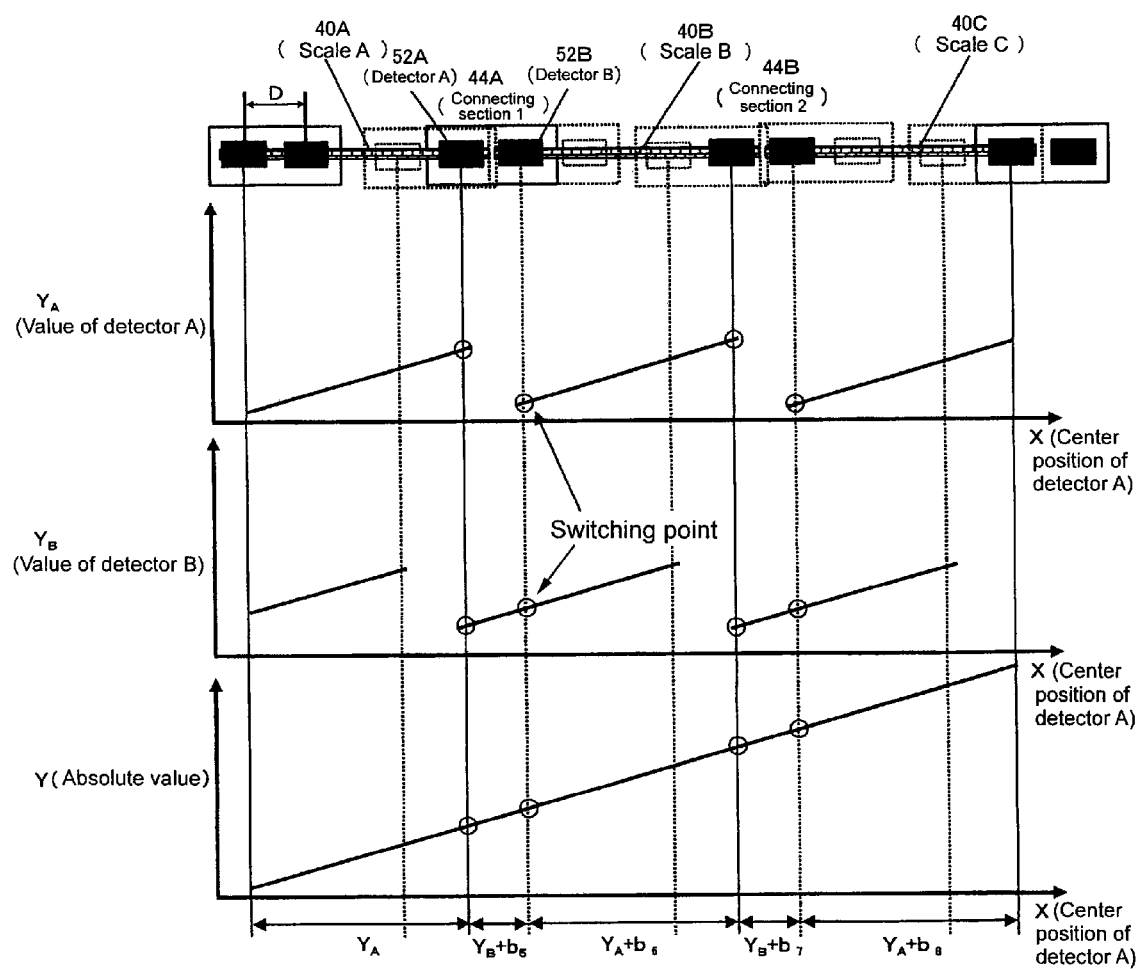
FIG. 10 is a diagram showing the operation of the third and fourth exemplary embodiments.

The operation of this exemplary embodiment is the same as that of the fourth exemplary embodiment showing the following FIG. 10, so that the description thereof will be omitted.

In this exemplary embodiment with the two scales, since the steel tape 46 is provided on the side of the right scale 40B as a one-bit distinguishing code, only one magnetic sensor 54 is necessary as a distinguishing code sensor to detect the code. A magnetic metal tape except for the steel tape may be glued, or a step may be provided in a magnetic steel base. Otherwise, a steel tape may be provided on the other side too in addition to one side as an n-bit more than two bit distinguishing code.

Figure 7:
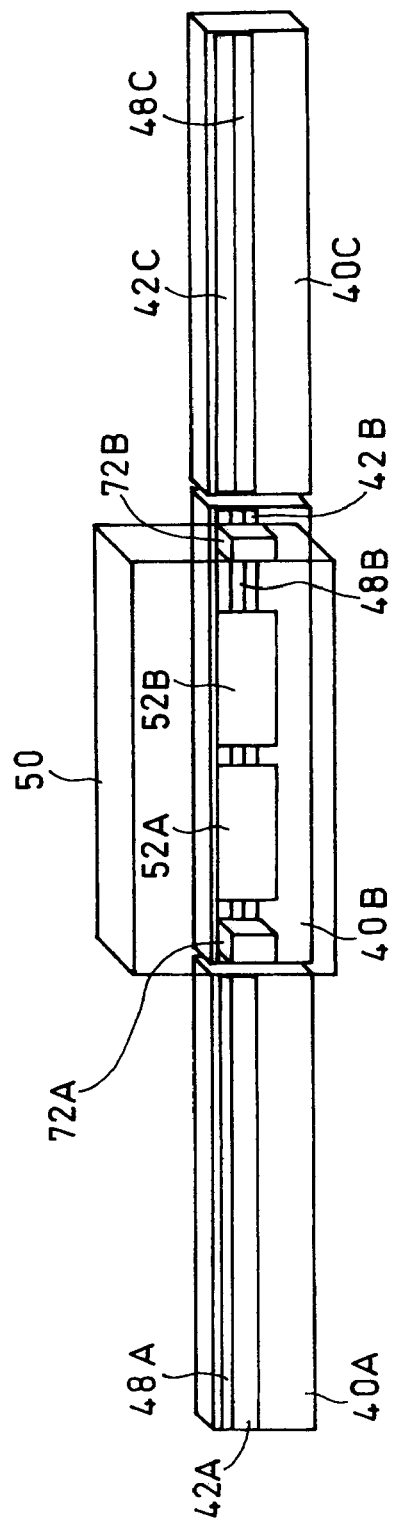
FIG. 7 is a perspective view showing the essential structure of a fourth exemplary embodiment of the present invention.
Figure 8:
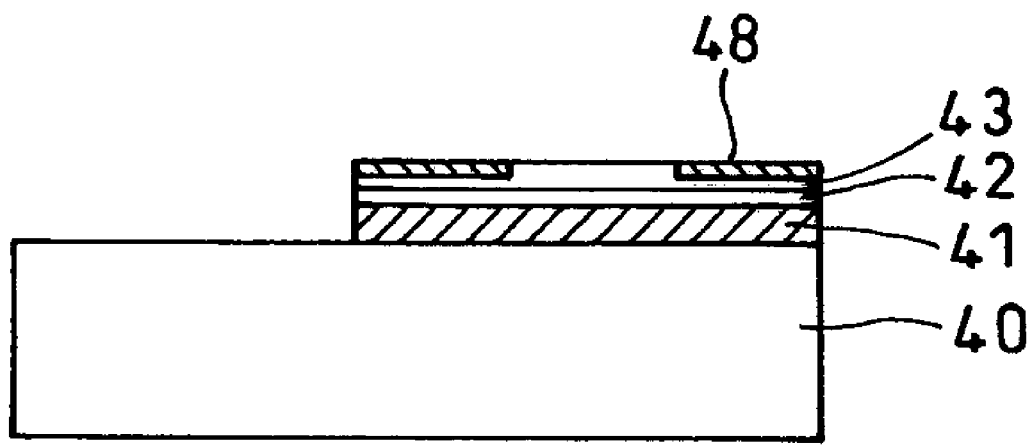
FIG. 8 is a cross sectional view of the same exemplary embodiment.

Like the fourth exemplary embodiment in which three scales 40A, 40B, and 40C are coupled as shown in FIG. 7 (essential perspective view) and FIG. 8 (cross sectional view of a scale), a code for distinguishing the scales may be provided in a face disposed in a thickness direction except for a face of scale main calibrations.

In this exemplary embodiment, as shown in FIG. 8, an n-bit light and dark pattern 48 for optical detection is printed on a protective film 43 on electromagnetic induction type of main calibrations 42 made of a copper foil pattern, and photoelectric sensors 72A and 72B such as photo-reflectors mounted on the detection head 50 as the cord distinguishing sensor are allowed to detect it. In FIG. 8, the reference numeral 40 denotes a scale base made of, for example, stainless steel, and 41 an insulating plate.

Figure 9:
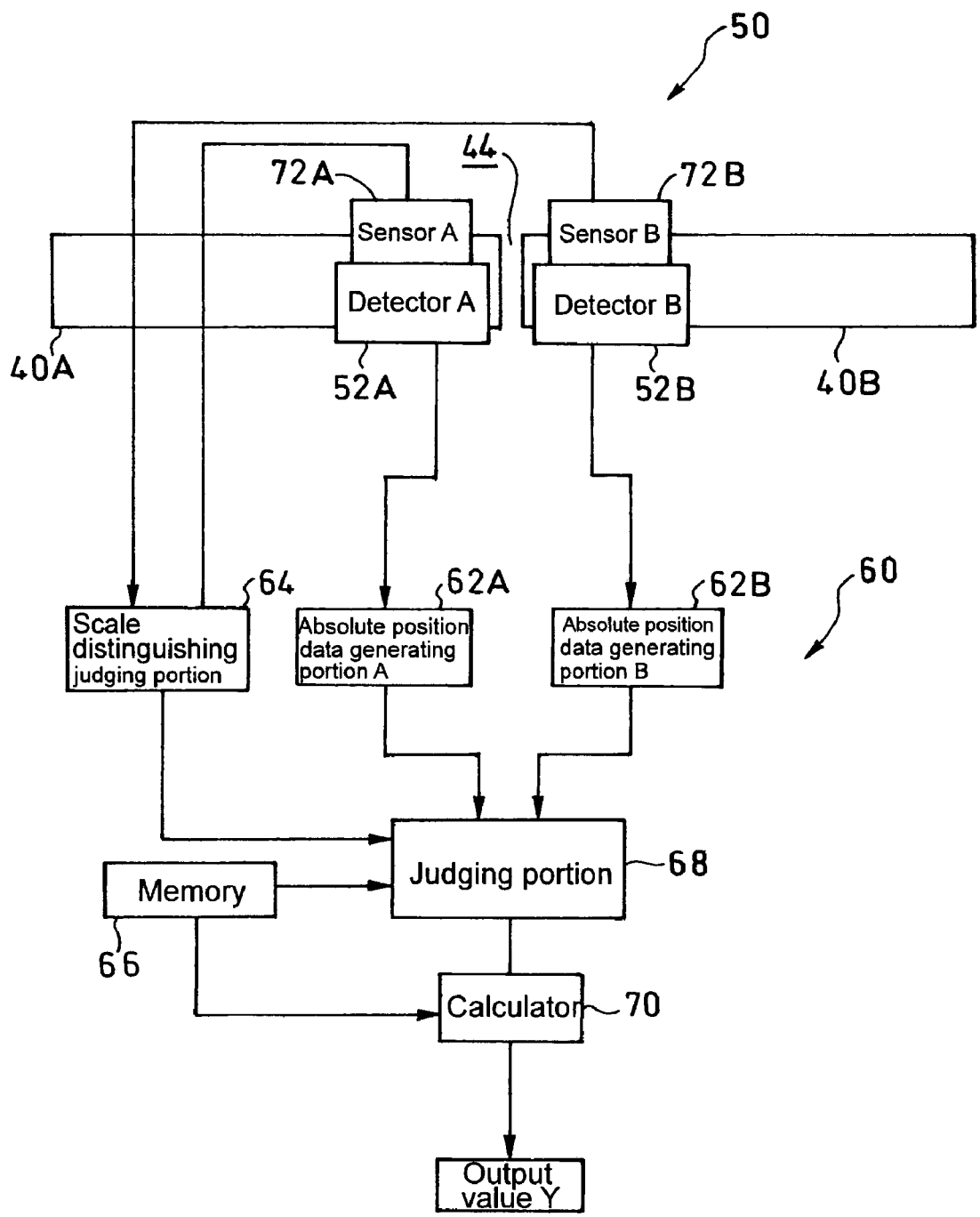
FIG. 9 is a block diagram showing a signal processing circuit of the same exemplary embodiment.

FIG. 9 shows a signal processing circuit according to this exemplary embodiment. The same reference numbers as FIG. 6 refer to identical components and the description thereof will be omitted.

In the fourth exemplary embodiment, two detectors 52A and 52B, which are opposed to n (n=3 in the drawing) scales 40A, 40B, and 40C having absolute calibrations (main calibrations) 42A, 42B, and 42C for main positioning, detect the main calibrations. Using two scale distinguishing sensors 72A and 72B, it is judged that which of the absolute position data of such detectors should be outputted in accordance with a position on the scale, and the absolute position data is outputted with adding a predetermined offset value. In this case, it is not necessary to strictly align the scales in attaching the scales, and the differences of absolute position data among the scales are stored as offset values.

Then, as shown in FIG. 10, of the n scales, with respect to a scale (for example, 40A) to be referred, output absolute position data is determined by adding the offset value to the detection position of the other scales (for example, 40B and 40C).

In this embodiment, each scale A, B or C has the same absolute position detection value. Further, absolute value Y of whole scale which is a combination of the scales A, B and C is defined to be an absolute value of center position of the detector A.

At the switching points of the connecting sections 1 and 2, absolute position data by the both detectors A and B to the scales A and B, or to the scales B and C are output at the same time.

Each offset values $b_5$, $b_6$, $b_7$ and $b_8$ may be measured actually by a master scale and determined. The distance D between the detectors is included in the offset values $b_5$, $b_6$, $b_7$ and $b_8$.

Independent sensor for distinguishing scales to know on which scale the detectors A and B exist directly after power on, is necessary. This sensor may be comprising distinguishing pattern on each scale and sensor provided on one or both of the detectors A and B, to detect the pattern.

Namely, in this exemplary embodiment, at the time of turning power on, a boarder area is judged on the signal levels of the sensors 72A and 72B, the detector to be adopted and the necessary offset value are selected to calculate the absolute position. After the power is turned on, detector switching positions and the corresponding offset values are judged on the basis of the absolute position.

According to the third and fourth exemplary embodiments, it is possible to detect the longitudinal absolute position with the use of a plurality of scales with a limited absolute range by the scale distinguishing code. Also, the switching of the absolute position data is easy since it is possible to judge the outputted absoluted position data by using the absolute values of the two detectors and the scale distinguishing code with rough precision.

Furthermore, the layout of the calibrations is easy because the absolute position calibrations are not on the same plane as the scale distinguishing pattern. If they are on the same plane, on the other hand, the width of the calibrations may be expanded or the detector may be complicated.

Figure 11:
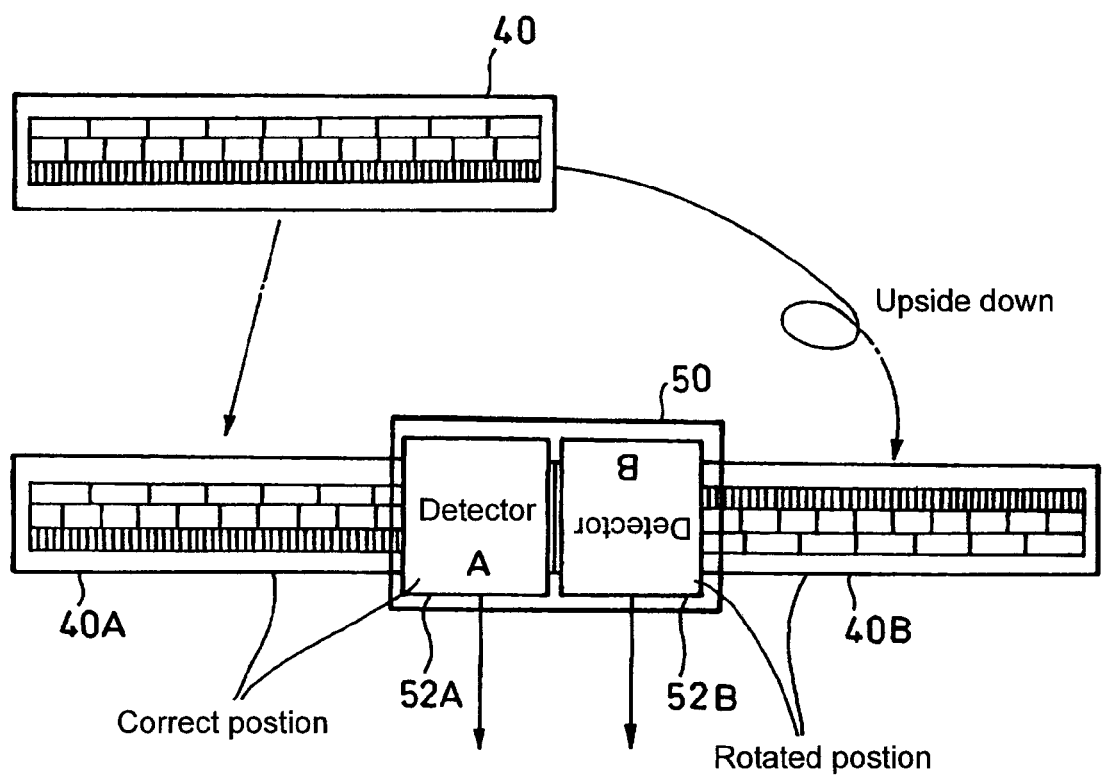
FIG. 11 is a plane view showing the structure of a fifth exemplary embodiment of the present invention.

FIG. 11 shows a fifth exemplary embodiment.

In this embodiment, one (40A of left side in FIG. 11) of the same absolute scales 40 is disposed correctly, and the other (40B of right side in FIG. 11) is rotated 180° and disposed upside down (to be called as "rotated position"). Likewise, left side detector 52A is disposed correctly, and right side detector 52B is disposed in the rotated position.

In this embodiment, ABS detection signal is output only when both the scale and the detector are in correct position, or both the scale and the detector are in the rotated position. Otherwise, error signal is output. Namely, the detector 52A outputs the ABS detection signal and the detector 52B outputs the error signal when the head 50 exists on the left side scale 40A. On the other hand, the detector 52B outputs the ABS detection signal and the detector 52A outputs the error signal when the head 50 exists on the right side scale 40B.

Namely, ABS position Y on the whole measuring range is expressed as follows:

$Y=Y_A$, if the detector $52A \rightarrow Y_A$ and the detector $52B \rightarrow$ error output, $Y=Y_A$, if the detector $52A \rightarrow Y_A$ and the detector $52B \rightarrow Y_B$, $Y=Y_B+b$ if the detector $52A \rightarrow$ error output and the detector $52B \rightarrow Y_B$.

This embodiment has advantage that (1) sensor for detecting the head 50 is not necessary, and (2) system can by constructed by the same two ABS scales and the same two detectors.

Instead of the above method using error output, position for switching output from the detector 52A to be the detector 52B or vice versa, may be provided at a predetermined position within a range where both the detectors 52A and 52B output detection signal (not error output). Further, hysteresis may be provided to the switching position.

In the foregoing exemplary embodiments, the absolute calibrations are of an electromagnetic induction type, but the structure of the main absolute calibrations is not limited to it. For example, a photoelectric type or a capacitance type is available.

It should be apparent to those skilled in the art that the above-described exemplary embodiments are merely illustrative which represent the application of the principles of the present invention. Numerous and varied other arrangements can be readily devised by those skilled in the art without departing from the spirit and the scope of the invention.

What is claimed is:

1. An absolute linear encoder for detecting an absolute position, comprising:

a plurality of absolute scales aligned in a direction of detection, each of the absolute scales having absolute calibrations that are identical to one another and used to detect the absolute position;

a plurality of detectors for detecting the calibrations on the absolute scales, the detectors being fixed at intervals so as to simultaneously detect the calibrations of two adjoining absolute scales in a scale connecting section;

absolute position data generating portions of each scale for generating absolute position data of each detector;

a calculator for outputting the absolute position over the whole length of connected whole absolute scales by adding the absolute position data of each detector and an offset value between the detectors, and means for distinguishing the plurality of absolute scales from each other, said distinguishing means including a distinguishing code that is distinct from the absolute calibrations and provided on at least one of the plurality of absolute scales.

2. The absolute linear encoder according to claim 1, further comprising
   judging portion for switching the plurality of detectors with hysteresis processing at switching.

3. The absolute linear encoder according to claim 1, wherein
   the plurality of absolute scales are disposed upside down with each other.

4. The absolute linear encoder according to claim 1, wherein
   the distinguishing code is a magnetic metal tape that is disposed on one face of the scale while the absolute calibrations are disposed on a different face of the scale, and a magnetic sensor is used as a distinguishing code sensor.

5. The absolute linear encoder according to claim 1, wherein
   the absolute position to be outputted is judged using absolute position data detected by the plurality of detectors.

6. An absolute linear encoder for detecting an absolute position, comprising:

a plurality of absolute scales aligned in a direction of detection, each of the absolute scales having absolute calibrations that are different from the absolute calibrations on the remaining absolute scales, said absolute calibrations being used to detect the absolute position;

a plurality of detectors for detecting the calibrations on the absolute scales, the detectors being fixed at intervals as to simultaneously detect the calibrations of two adjoining absolute scales in a scale connecting section;

absolute position data generating portions of each scale for generating absolute position data of each detector a calculator for outputting the absolute position over the whole length of connected whole absolute scales adding the absolute position data of each detector and an offset value between the detectors.

7. The absolute linear encoder according to claim 6, wherein the absolute position to be outputted is judged using absolute position data detected by the plurality of detectors.

8. The absolute linear encoder according to claim 6, further comprising
   judging portion for switching the plurality of detectors with hysteresis processing at switching.

9. An absolute linear encoder for detecting an absolute position, comprising:
   a plurality of absolute scales aligned in a direction of detection, each of the absolute scales having absolute calibrations that are identical to one another and used to detect the absolute position, each of said scales further including means to distinguish the scales from each other;
a plurality of detectors for detecting the calibrations on the absolute scales, the detectors being fixed at intervals so as to simultaneously detect the calibrations of two adjoining absolute scales in a scale connecting section;
absolute position data generating portions of each scale for generating absolute position data of each detector; and
a calculator for outputting the absolute position over the whole length of connected absolute scales adding the absolute position data of each detector and an offset value between the detectors,
wherein, the distinguishing means is a distinguishing code that is disposed on a layer of the scale that is distinct from the absolute calibrations.

10. The absolute linear encoder according to claim 9, wherein
the distinguishing code is a light and dark pattern printed on a protective film of the absolute calibrations of an electromagnetic induction type or a capacitance type, and a photoelectric sensor is used as a distinguishing code sensor.

11. The absolute linear encoder according to claim 9, further comprising
judging portion for switching the plurality of detectors with hysteresis processing at switching.

* * * * *